Oct. 8, 1940.　　　F. H. GULLIKSEN　　　2,217,477
PHASE DIFFERENCE INDICATOR
Filed June 23, 1939

WITNESSES:

INVENTOR
Finn H. Gulliksen.
BY
Paul E. Friedemann
ATTORNEY

Patented Oct. 8, 1940

2,217,477

UNITED STATES PATENT OFFICE 2,217,477

PHASE DIFFERENCE INDICATOR

Finn H. Gulliksen, Pittsburgh, Pa., assignor to Westinghouse Electric & Manufacturing Company, East Pittsburgh, Pa., a corporation of Pennsylvania Application June 23, 1939, Serial No. 280,684

6 Claims. (Cl. 172—245)

My invention relates to a phase angle indicator or controller and is more specifically directed to a direct-current operated indicator or controller which is effective to give either an accurate indication of or an accurate impulse responsive to deviation from a predetermined optimum value of the phase angle between two alternating-current voltages.

An object of my invention is to provide an electrical apparatus which will accurately and with high sensitivity give a direct-current indication or a direct-current control impulse of a variation in alternating-current phase angle from a pre-selected value.

Another object of my invention is to provide a control circuit responsive to the relative phase angles of two alternating-current voltages with respect to a given supply voltage including a pair of Thyratron tubes so interconnected that conduction of one tube precludes conduction of the other, and the conduction of a particular tube is indicative of which of the phase angles is greater.

Other objects and advantages will become more apparent from a study of the following specification when considered in conjunction with the accompanying drawing, in which.

Figure 1:
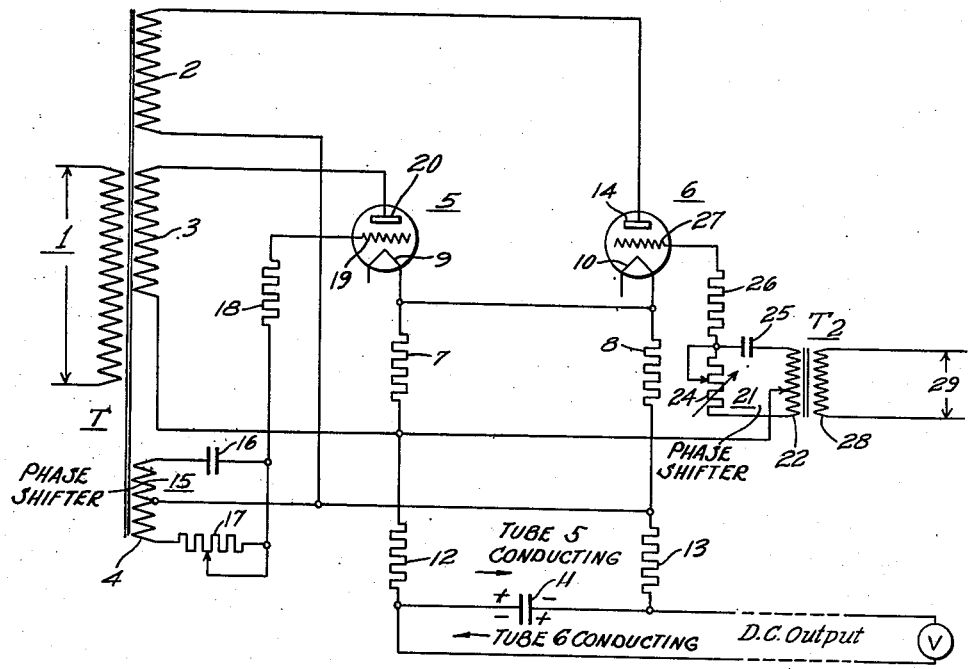
Figure 1 is a schematic showing of a circuit embodying the principle of my invention.

Numeral 1 indicates an alternating-current source of potential applied to the primary of a transformer T. Numerals 2, 3 and 4, respectively denote secondary windings of the transformer. Numerals 5 and 6 denote two Thyratron tubes. The reference numerals 7 and 8 denote resistors connected respectively to the cathodes 9 and 10 of the tubes 5 and 6. A capacitor 11 is connected across resistors 7 and 8 through two intermediate resistors 12 and 13. Connected across the terminals of condenser 11 is a direct-current voltmeter V. The upper terminal of the secondary winding 2 is connected to the anode 14 of the tube 6, whereas the lower terminal thereof is connected through a phase shifter 15, including capacitor 16, resistor 17 and secondary winding 4, to a resistor 18, which, in turn, is connected to the grid 19 of tube 5.

The phase shifter 15 is so adjusted, or calibrated, by suitable design of its elements and, if necessary, adjustments of the capacitor 16 and resistor 17, that the tube 5 will become conducting, or break down, at a 90 electrical degree lag with reference to the voltage of the alternating-current supply when the potential drop across resistor 7 is zero. The upper terminal of secondary 3 is connected to the anode 20 of tube 5, whereas the lower terminal thereof is connected to an intermediate point between resistors 7 and 12, thence to a phase shifter 21 which includes the secondary winding 22 of an auxiliary transformer $T_2$, adjustable resistor 24 and condenser 25, thence to a resistor 26 and finally to the grid 27 of tube 6. The primary 28 of the auxiliary transformer $T_2$ is fed by a second source of alternating current 29.

Figure 2:
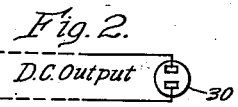
Fig. 2 shows a modification of the indicating means used in Fig. 1.

The operation of my device is as follows: If the characteristics of the circuits are such that tube 5 is passing current, then the current flow through resistor 7 produces a negative bias on the grid 27 of tube 6, which negative bias opposes the positive bias obtained from resistor 24 of the phase shifter 21 making the cathode 10 of tube 6 positive with respect to the grid 27 thereof, thus preventing the passing of current through tube 6. In a like manner, resistor 8, together with phase shifter 15 and resistor 18 functions to block passage of current through tube 5 when tube 6, instead of tube 5 is conducting. Depending upon whether the current is flowing through tube 5 and resistor 7 or whether it is flowing through tube 6 and resistor 8, capacitor 11 is charged with its left plate positive and its right plate negative or vice versa, respectively. It is this difference in the direction of charging of capacitor 11 which provides an indication of the relative phase angle between the voltages applied to the respective grids. By placing a direct-current voltmeter V across capacitor 11, a visual indication can be received of the direction of charge on the condenser. Other indicating means could be used instead of a direct-current voltmeter. For example, as shown in Fig. 2, a glow lamp 30 could be used and by noting whether the negative glow is associated with one electrode or the other, the direction of charge of the condenser can be readily ascertained merely by observation.

Assume that it is desired to determine the phase of the potential supplied by phase shifter 21. This object is accomplished by observing the polarity of the potential impressed from tube 5 or 6 on the condenser. If the phase angle of the potential supplied by such phase shifter to tube 6 is smaller than that supplied by the phase shifter 15 leading to tube 5, tube 6 is rendered conductive, thus preventing tube 5 from becoming conductive. In such case, the capacitor 11 is charged with its right-hand plate positive and its left-hand plate negative. If, on the other hand, the phase angle through phase shifter 21 is greater than that through phase shifter 15, then the capacitor will be charged with an opposite polarity.

Figure 3:
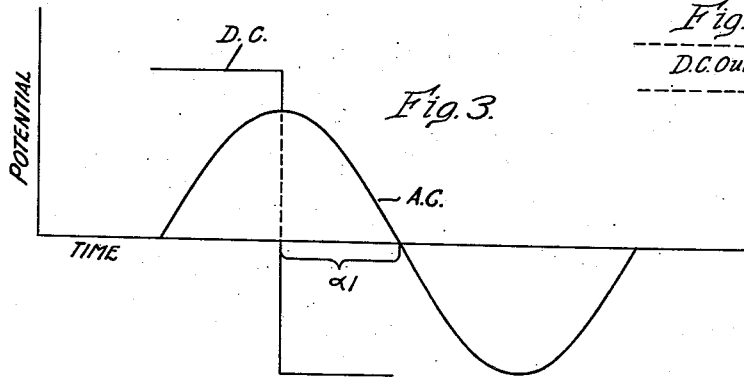
Fig. 3 shows a curve illustrating phase angle relationship.

Fig. 3 shows the relationship between the direct-current output voltage and the alternating-current source of supply 1 when the phase shifter 21 is either not in the circuit or is in the circuit but possessing very little phase shifting ability. It will be noted that in this situation, the change in direction of the direct current voltage is at the maximum point of the alternating current voltage curve, that is, when $a1=90°$. For obtaining other relationships or breakdown values of the tubes, that is, for making $a1$ either greater than or less than 90°, it is necessary merely to vary the value of phase shifter 21 by varying resistor 24 thereof.

Although the direct-current output is shown as being for indicating purposes, it will be apparent that it is also useful for control purposes, for example to operate Thyratron control circuits, relays, or, in fact, any other desirable types of control. An example of the application of the above described circuit to a register control in connection with a slitter control has been described in my application Serial No. 212,521 filed June 8, 1938, entitled "Registration control systems."

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art as may be pertinent.

I claim as my invention:

1. Apparatus for determining the relative phase angle of a pair of voltages with respect to a given supply voltage, comprising in combination, a pair of Thyratron tubes, each comprising an anode, cathode and grid; a pair of resistors, each of which is connected to the cathodes of the respective tubes, a pair of alternating current sources in phase with said supply voltage, each of said pair of alternating current sources having one terminal connected to the anode of one tube and the other terminal connected through circuit means to the grid of the other tube, one of said circuit means including a phase shifter and an external source of alternating current, a condenser connected across the terminals of said resistances and which is adapted to be charged in one direction or the other depending upon the relative value of the phase angles of the voltages applied to the respective grids.

2. Apparatus for determining the relative phase angle of a pair of voltages with respect to a given supply voltage comprising a pair of Thyratron tubes, each comprising an anode, cathode and grid; a pair of resistors, each of which is connected to the cathode of one of said tubes, a pair of alternating current sources in phase with said supply voltage, each of said pair of alternating current sources having one terminal connected to the anode of one tube and the other terminal connected through circuit means to the grid of the other tube, at least one of said circuit means including a phase shifter and an external source of alternating current, a condenser connected across the terminals of said resistances and which is adapted to be charged in one direction or the other depending upon the relative value of the phase angles of the voltages applied to the respective grids, indicating means connected across the terminals of said condenser for indicating the direction of charge, hence the relative phase angles of said voltages.

3. Apparatus for determining the relative phase angle of a pair of voltages with respect to a given supply voltage comprising a pair of Thyratron tubes, each comprising an anode, cathode and grid, a pair of resistors, each of which is connected to the cathode of one of said tubes, a pair of alternating current sources in phase with said supply voltage each of said pair of alternating current sources having one terminal connected to the anode of one tube and the other terminal connected through a phase shifter to the grid of the other tube, an external alternating current source which is impressed on one of said anode-to-grid connections, a condenser connected across the terminals of said resistances and which is adapted to be charged in one direction or the other depending upon the relative value of the phase angles of the voltages applied to the respective grids, a direct current voltmeter connected across the terminals of said condenser for reading the direction of the charge and said relative value of phase angles.

4. Apparatus for determining the relative phase angle of a pair of voltages with respect to a given supply voltage comprising a pair of Thyratron tubes, each comprising an anode, cathode and grid; a pair of resistors each of which is connected to the cathode of one of said tubes, a pair of alternating current sources in phase with said supply voltage, each of which has one terminal connected to the anode of one tube and the other terminal connected through a phase shifter to the grid of the other tube, each of said phase shifters including a resistance, capacitor and a transformer secondary coil, a second alternating source of potential which is applied to the primary of one of said phase shifter secondary coils, a condenser connected across the terminals of said first-mentioned resistances and which is adapted to be charged in one direction or the other, depending upon the relative value of the phase angles of the voltages applied to the respective grids.

5. An electrical circuit including an alternating-current supply source and a pair of Thyratron tubes, each including an anode, grid and cathode, connecting means for electrically connecting the cathode of each tube to the grid of the other tube each of which includes a resistance and a phase shifter, an external source of alternating potential which is impressed on one of said connecting means, said alternating-current supply source being connected across the anode and grid of each of said tubes through said connecting means thereby permitting only one tube to become conducting at any particular time, an output control circuit including a condenser connected across the cathodes of said tubes which provides a direct-current output in one direction or the other depending upon the relative values of the phase angles of the grid voltages of said tubes with respect to the voltage of said alternating-current supply source, that is, depending upon which of the two tubes has become conductive.

6. An electrical circuit including an alternating-current supply source and a pair of Thyratron tubes, each including an anode, grid and cathode, connecting means for electrically connecting the cathode of each tube to the grid of the other tube each of which includes a resistance and a phase shifter, an external source of alternating potential which is impressed on one of said connections, said alternating-current supply source being connected across the anode and grid of each of said tubes through said connecting means thereby permitting only one tube to become conducting at any particular time, an output control circuit including a condenser connected across the cathodes of said tubes which provides a direct-current output in one direction or the other depending upon the relative values of the phase angles of the grid voltages of said tubes with respect to the voltage of said alternating-current supply source, that is, depending upon which of the two tubes has become conductive, said output control circuit including means which is polarized and controlled in accordance with the direction of charge of said condenser.

FINN H. GULLIKSEN.